Figure 1:
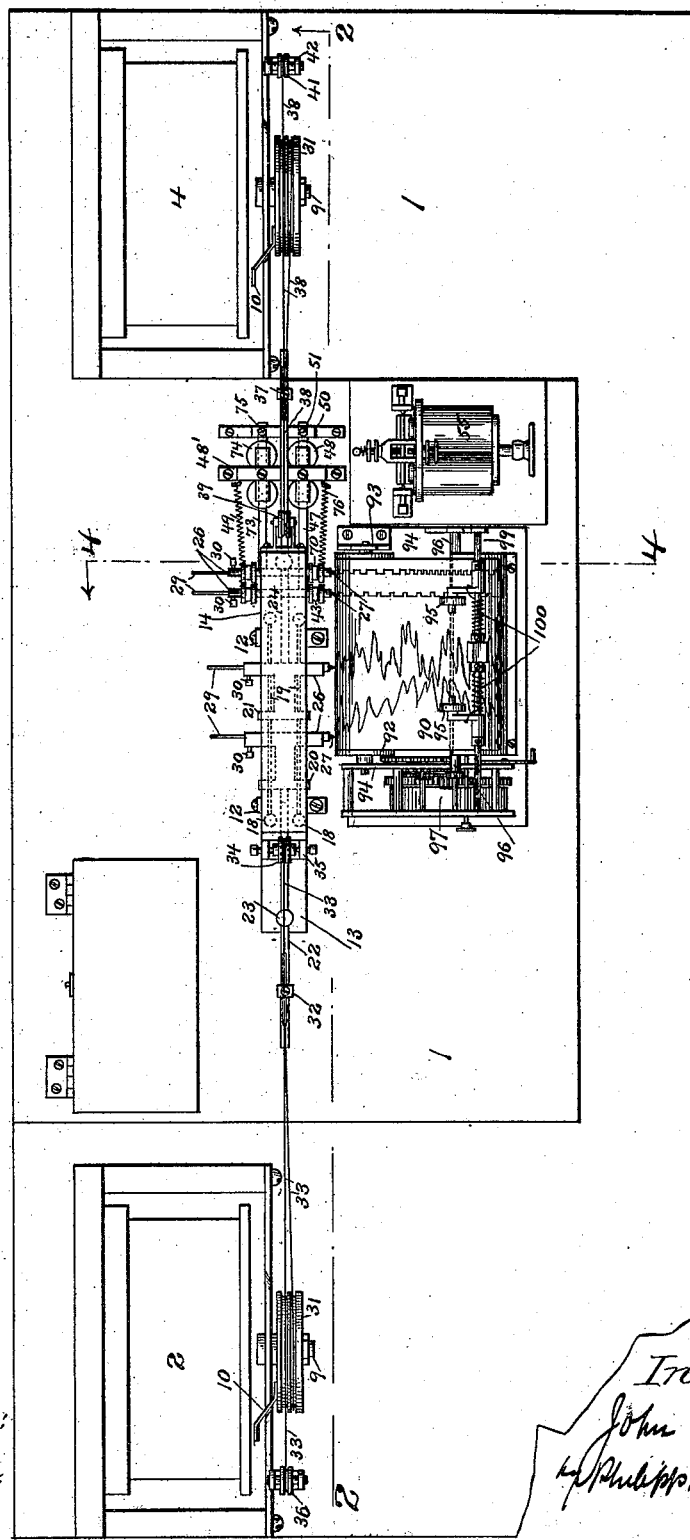

No. 688,783. Patented Dec. 10, 1901.
J. D. KEILEY.
RECORDING DEVICE.
(Application filed July 17, 1900.)

(No Model.) 4 Sheets—Sheet 1.

Attest:
A. White
J. A. Graves

Inventor:
John D. Keiley
by Philipp, Sawyer, Rice & Kennedy
Attys

THE NORRIS PETERS CO., PHOTO-LITHO., WASHINGTON, D. C.

No. 688,783.

J. D. KEILEY.
RECORDING DEVICE.
(Application filed July 17, 1900.)

Patented Dec. 10, 1901.

(No Model.)

4 Sheets—Sheet 2.

Attest:
A. White
J. N. Graves.

Inventor
John D. Keiley
by Philipp, Sawyer,
Rice & Kennedy
Attys.

No. 688,783. Patented Dec. 10, 1901.
J. D. KEILEY.
RECORDING DEVICE.
(Application filed July 17, 1900.)
(No Model.) 4 Sheets—Sheet 3.
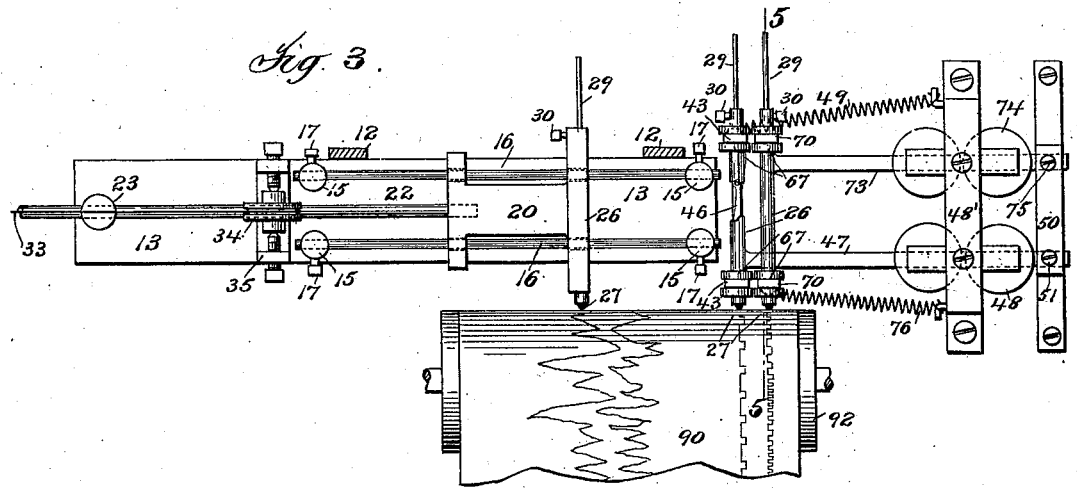
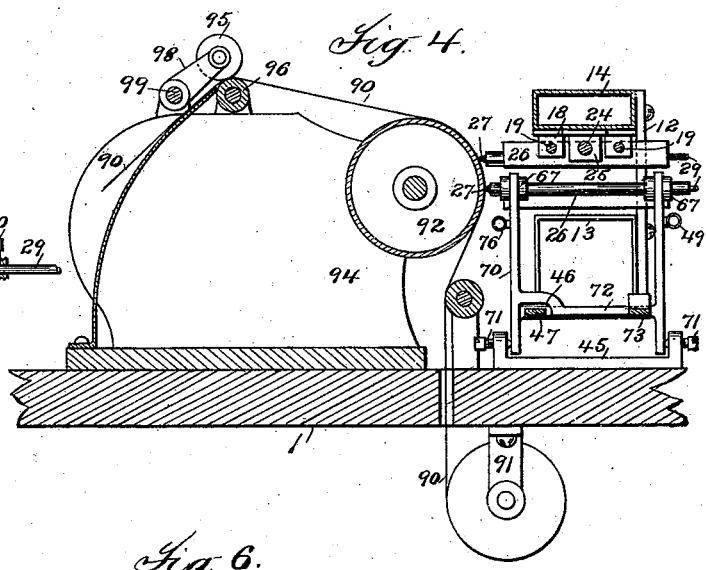
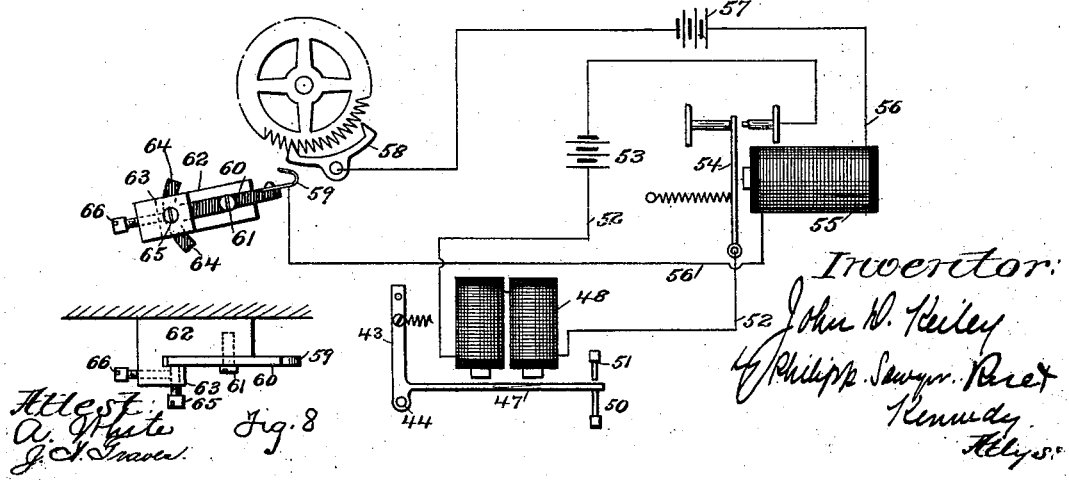

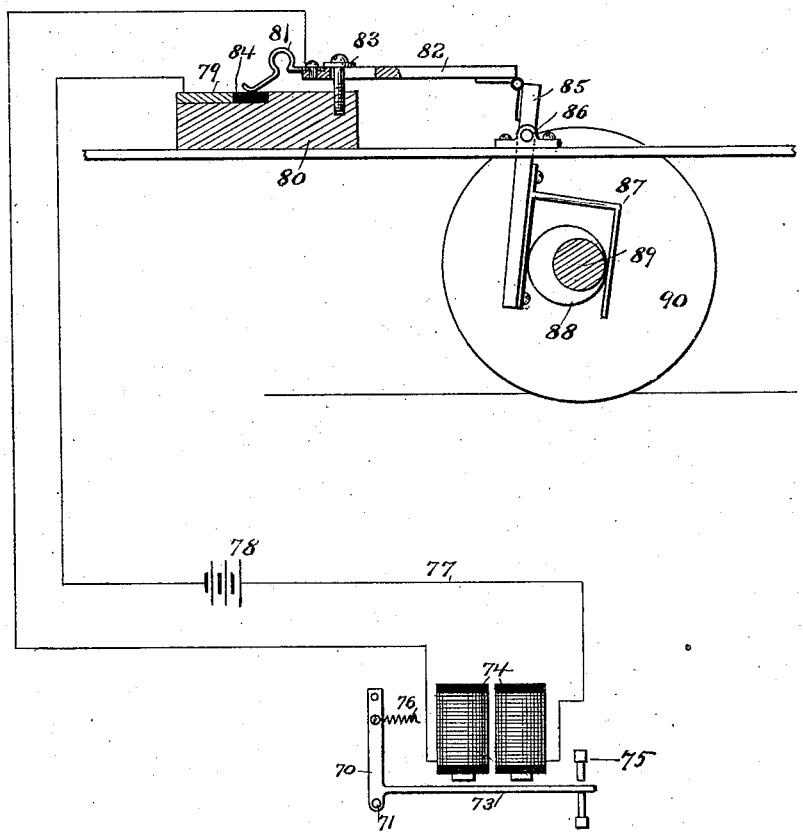

UNITED STATES PATENT OFFICE.

JOHN D. KEILEY, OF NEW YORK, N. Y.

RECORDING DEVICE.

SPECIFICATION forming part of Letters Patent No. 688,783, dated December 10, 1901.

Application filed July 17, 1900. Serial No. 23,876. (No model.)

*To all whom it may concern:*

Be it known that I, JOHN D. KEILEY, a citizen of the United States, residing at New York, county of Kings, and State of New York, have invented certain new and useful Improvements in Recording Devices, fully described and represented in the following specification and the accompanying drawings, forming a part of the same.

This invention relates to certain improvements in recording devices.

In the operation of many classes of machinery it is desirable to measure the amount of power applied in a machine, the number of mechanical operations produced by the machine, and to record the time during which the application of the power and the mechanical operations occur, and it is furthermore desirable that such recording devices be arranged to produce records which are continuous, or substantially so, in order that a comparison may show not only the power consumed during any given time and the number of mechanical operations produced during that time, but also the variations, both relative and absolute, of the power and mechanical operations for any instant or period during the time. Thus, for instance, in testing the results of electrical power as applied to moving railroad trains, it is desirable to note not only the amount of power consumed in a given time and the distance over which the train has traveled, which can be determined by noting the revolutions of the wheels, but it is also desirable to note variations in the current during given periods of time and the corresponding variations in the speed of the train.

Heretofore records of the application of electrical power to moving railroad-trains have usually been obtained by mounting in a car an ammeter, a voltmeter, and either a speed-recorder or a recorder for the number of wheel revolutions. An operator has been stationed at each meter and recorder to make simultaneous observations, the signal for the times of observation being given by another operator who usually holds a stop-watch and the records being made by other persons provided for that purpose. This method of recording is cumbersome, expensive, and is furthermore inaccurate, because the times of observation cannot be close together and very considerable variations in the current may take place between them.

It is the object of this invention to produce an improved power-recording apparatus by the use of which a record may be kept of the variations in the power applied to a machine, of the period or periods during which the power is applied, and of the mechanical movements produced by the machine, and the invention further has in view the production of improved mechanisms or appliances by which the several operations carried out by the apparatus are effected.

The invention consists in certain constructions and in certain parts, improvements, and combinations, as will be hereinafter fully described, and then specifically pointed out in the claims hereunto appended.

Figure 2:
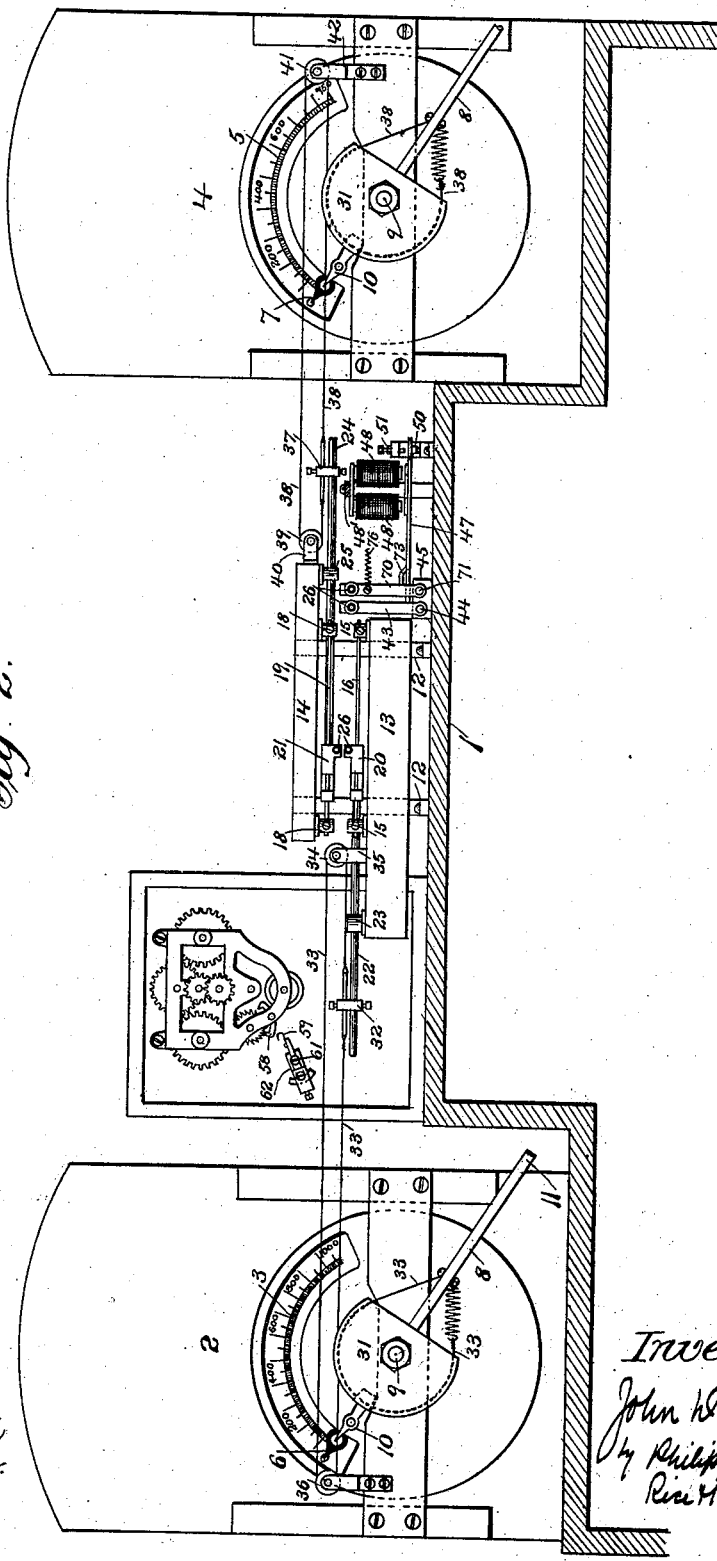

Referring to the drawings which form a part of this specification, and in which like characters of reference indicate the same parts, Figure 1 is a plan view of the improved recording mechanism. Fig. 2 is a sectional elevation on the line 2 2 of Fig. 1. Fig. 3 is a detail plan view, on an enlarged scale, showing the construction of devices for supporting the recording-pencils. Fig. 4 is a sectional elevation on the line 4 4 of Fig. 1. Fig. 5 is a detail sectional view on the line 5 5 of Fig. 3, illustrating the construction of the pencil-holder. Fig. 6 is a diagram of the circuits employed for operating the magnets of the time-recorder and showing the circuit-closer employed. Fig. 7 is a detail side elevation of a part of the circuit-closer. Fig. 8 is a detail view illustrating the construction of the circuit-closer used in connection with the revolution-recorder.

Referring to the drawings, which illustrate a concrete embodiment of the invention as applied to the measurement of the power and speed of electric-railway trains, 1 indicates a frame, which may be of any suitable material and configuration. The current-recording devices, which may be of any suitable description, consist of an ammeter 2, supported on the frame in any suitable manner and provided with the usual reading-scale 3, and a voltmeter 4, having a reading-scale 5. These meters 2 and 3 are provided with the usual indicating-hands 6 and 7, which travel over the indicating-scale.

Under certain circumstances it may be desirable to establish direct mechanical connections between the hands of the indicators and the recording devices, to be hereinafter described. Because, however, of the extreme delicacy of the electrical meters now employed it is preferable to provide means for operating the recording devices which shall be actuated otherwise than by the hands of the meters.

The means by which the recording devices are caused to record the movements of the indicating-hands may be widely varied in character. In the preferred construction, however, there is provided an actuator, which is located in the same visual field as the indicator-hand of the meter with which it coöperates. These actuators in the preferred form of the construction are located in front of the meters 2 and 4 and are in the form of levers 8, pivoted at 9, the pivots 9 being concentric with the pivots of the indicator-hands. These actuator-levers 8 are formed to provide pointers 10, which can be made to follow the movements of the indicating-hands 6 and 7 of the meters and are preferably provided with handles 11. It is apparent that an operator by seizing the handle 11 can give the actuator-levers 8 movements which correspond to the movements of the meter-hand, and since each actuator-lever is in the same visual line as the meter indicator-hand the operator can follow the movement of the hand closely, it not being necessary to look first at the meter and then at the indicator.

Any suitable recording mechanism may be provided to record the movements of the levers 8. In the construction shown the bed is provided near its center with uprights 12, which carry supports 13 and 14, these supports consisting of flat metal tubes. The support 13 is provided with a set of short perforated standards 15, which serve to support a pair of parallel rails 16, which are secured in the standards in any suitable manner, as by set-screws 17. Similarly the support 14 is provided with a set of short perforated standards 18, depending from the under side of the support 14. These standards 18 carry rails 19, suitably secured in the standards in any suitable manner, as by set-screws. The rails 16 and 19 serve to support and guide movable carriages 20 and 21, the carriage 20 moving on the rails 16 and the carriage 21 on the rails 19. The carriage 20 has connected to it a rod 22, said rod passing through a suitable guide 23, mounted on the support 13. The carriage 21 has connected to it a similar rod 24, said rod passing through a guide 25, secured to the under side of the support 14.

Each of the carriages 20 and 21 is provided with a holder of any suitable description, said holder sustaining a recording instrument. Preferably, however, each of these holders consists of a tube 26, (see Fig. 5,) said tube being suitably secured to the carriage. In the forward end of the tube is located a suitable recording instrument, which may consist of a lead or pencil 27, the inner end of which presses against a spring 28, located in the tube. In order to adjust the pressure of the recording instrument against the surface upon which it is to make a record, a rod 29 is provided, said rod being located in the end of the tube opposite to that which contains the recording instrument and bearing against the spring 28. This rod is held in position by means of a set-screw 30 or in any other suitable manner. It is apparent that by pushing the rod in and securing it in position by the set-screw the tension of the spring 28 may be adjusted so as to cause the recording instrument to bear against the recording-surface with any desired pressure.

Suitable means, to be hereinafter described, are provided for moving a recording-surface, such as a strip of paper, past the recording instruments at any desired rate of speed, and suitable connections are provided for causing the instruments to move in a direction at an angle to the movement of the recording-surface, these movements of the instruments being produced by the actuator-levers 8, before described.

Any suitable connections may be provided, through the agency of which the movements of the actuator-levers is caused to produce movements of the carriers and recording instruments. In the construction shown, however, each of the actuator-levers 8 is provided with a drum 31. The rod 22 of the carriage 20 is provided with an adjustable bracket 32, and to this bracket is connected at one side a fine wire or cord 33, said wire passing over a pulley 34, secured in uprights 35, mounted on the support 13. From the pulley 34 the cord 33 passes over another pulley 36, suitably secured on the frame near the ammeter. After leaving this pulley the cord is given one or more wraps about the drum 31 and is led back to and secured to the adjustable support 32. The rod 24 is provided with an adjustable bracket 37, and to this bracket is secured a fine wire or cord 38, said wire passing over a pulley 39, mounted in standards 40, over a pulley 41, mounted in standards 42, and then being passed around the drum 31 of the voltmeter, after which it runs again to the adjustable standard 37. It is apparent that when the actuator-levers 8 are moved the carriages which are connected therewith will be given a movement which corresponds to the amplitude of the movement given the actuator-levers. If, therefore, a recording-surface be fed past the recording instrument at a given rate of speed and during the time when the recording-surface is caused to pass the recording instrument the actuator-lever be given a movement which corresponds with the movement of the meter to which it is attached, the recording instrument will trace a line upon the recording-surface which corresponds to the movements of the indicating-hand of the meter.

The apparatus so far described is the preferred form of construction for recording the variations of the voltage and amperage of electric currents. Any suitable device may be employed in connection with the devices before described or others embodying the same principle which will serve to record the divisions of time within which the current-variations occur. In the construction shown a suitable clock mechanism is employed, said mechanism being caused through suitable recording connections to produce indications on a recording-surface which correspond to any required divisions of time. While the connections through which the movements of the clock is transferred to the recording-surface may be widely varied, in the construction shown there is preferably provided a pencil-carrier, said carrier consisting of two upright arms 43, which are pivoted at 44 to blocks 45, mounted on the frame 1. These arms are preferably connected near their pivotal points by a cross-bar 46, from which extends an armature-lever 47, the magnet for said armature-lever being indicated at 48 and being supported by a bracket 48'. A suitable spring 49 is provided, which is connected to one of the arms 43 and to the bracket 48' or at any other suitable point, said spring operating to hold the armature-lever away from the magnet. A suitable stop 50 is provided, said stop being in the form of a loop and surrounding the rear end of the lever 47. This stop 50 is provided with a suitable set-screw 51 and acts to limit the movement of the armature-lever produced by the spring and the magnet, the screw 51 preventing the armature from actually touching the pole of the magnet, so that it may not be held there by residual magnetism when the magnet is demagnetized.

While other constructions of carrier may be substituted for the one which has been described, the form shown is deemed preferable, because a very rigid structure is produced which is at the same time light and easily moved by its operating devices. It is to be understood that when the apparatus is in use on a moving train it is subjected to an extraordinary amount of vibration. The carrier must therefore be sufficiently rigid so as to withstand this vibration, and at the same time it must be light enough to be quickly moved in order to enable the recording instruments to make their record.

The magnet 48 is magnetized and demagnetized by devices controlled by the clock, and any suitable circuit or circuits may be employed and any part of the clock-movement may be utilized for such controlling purposes. A convenient form of circuits is, however, illustrated in Fig. 6, in which the magnet 48 is shown as located in a relay-circuit 52, said circuit containing any suitable source of electrical energy—as, for instance, a battery 53. The relay-circuit is closed by means of a pivoted circuit-closing arm 54, said arm constituting the armature for a magnet 55. The magnet 55 is contained in a circuit 56, the battery for which is indicated at 57. The circuit 56 is preferably connected to the escapement-lever 58 of the clock mechanism and to a terminal consisting of any suitable conductor—as, for instance, a fine platinum wire 59, mounted on a lever 60, pivoted at 61 to a block 62, suitably mounted in the clock-casing. In the preferred construction the lever 60 is made of insulating material, but the terminal 59 may be insulated from the lever in any suitable manner. The block 62 has a recess forming an overhanging portion 63, which extends over the end of the lever 60, and the end of said lever carries or has integrally formed therewith an extension preferably in the form of a segment 64. Tapped through the overhanging portion 63 of the block 62 is a holding-screw 65, the end of said screw bearing on the segment 64 of the lever 61, thus locking the lever in any desired adjusted position. A second set-screw 66 may, if desired, be tapped through the block 62, the end of said screw bearing against the screw 65 and serving to lock the same in position. While other forms of circuit-closers may be used, the one just described is particularly adapted to withstand the great vibration to which the apparatus is subjected on many railroad-trains, and is therefore the preferred form.

The upper ends of the arms 43 carry a holder for a recording instrument which is similar to that before described—that is to say, it consists of a tube 26, having a spring for holding the instrument against the recording-surface and a rod for controlling the spring. In the construction shown, which is illustrated in Fig. 5, the ends of the tube 26 are threaded, and these threaded ends are passed through openings in the arms 43, suitable lock-nuts 67 being provided to hold the tube in position in the arms. The carrier is adjusted so that the end of the recording instrument will bear continuously with the proper pressure against the recording-surface. As the escapement-lever 58 rocks and closes the circuit at 59 the magnet 48 will be energized and will give the holder a movement which is at an angle to the direction of travel of the recording-surface, thus causing the recording instrument to be moved to interrupt the straight line which would otherwise be produced on the recording-surface. As the escapement-magnet rocks away from the terminal 59 the circuit is opened and the spring 49 draws the pencil-holder back to its original position. In the construction shown the circuit is closed every half-second; but the mechanism can be readily arranged to record any desired divisions of time.

This recorder is primarily intended to enable a comparison to be had between the amount of power consumed in a given time and the amount of work effected by the machine to which the power is applied. The amount of work effected by the machine may be arrived at in various ways, but may be obtained by recording the number of movements of some part of the machine to which the power is applied.

In the present construction, which, as has been before said, is intended to record the amount of power consumed and the distance traveled by an electric train in a given time, the amount of work effected resulting from the power may be obtained by recording the number of wheel revolutions. The devices by which the wheel revolutions are recorded may vary widely in form; but it is desirable that a continuous record of these revolutions be kept, said record being made simultaneously with the time and power records, so that a comparison of the different rates of speed which the train attains at different times can be had and can be compared with the amounts of power consumed in the same time.

In the preferred form of the construction the record of the wheel revolutions will be made by a pencil, which is mounted to make its record on the same recording-surface as the other recording instruments heretofore described. While the construction of the pencil supporting and operating devices may be varied within wide limits, they will preferably be substantially similar to those described in connection with the time-recording devices. A pencil-carrier consisting of arms 70 is provided, said arms being pivoted by the screws 71 to the blocks 45, before referred to and to which the arms 43 are pivoted. The arms 70 are preferably connected by a cross-bar 72. Extending from the cross-bar 72 is an armature-lever 73, said armature-lever being controlled by a magnet 74, mounted on the bracket 48'. The end of the lever 73 extends through the loop 50, before described as forming the stop for the lever 47, and a screw 75 is provided, which adjustably limits the movement of the armature-lever toward the magnet-poles. A spring 76 normally holds the arms 70 in such a position that the armature-lever is against the lower side of the stop 50, said spring being connected to one of the arms 70 and to the bracket which supports the magnet or to any other suitable part of the apparatus. The arms 70 support a holder 26, which is similar in all respects to the holders which have been hereinbefore described and of which, therefore, an extended description need not be given. The recording instrument is so adjusted in this holder as to bear continuously against the recording-surface.

Any suitable circuits including any suitable form of circuit-closing device may be employed to energize the magnet 74 at proper times to produce the recording movements of the pencil-holder and pencil. A suitable form of circuit is indicated in Fig. 7, in which the circuit is marked 77 and the battery or other source of electrical energy is marked 78. The circuit 77 is connected at one end to a contact-plate 79, which is mounted on a non-conducting-block 80, suitably secured to the frame of the truck or at any other suitable point on the car. The other end of the circuit 77 is connected to a spring-terminal 81, which is secured to a non-conducting sliding plate 82. This plate is slotted and has a screw 83 extending through its slot and into the block 80, before described. The end of the contact 81 rests on a plate 84, which is also a non-conducting plate and is set into the top of the block 80. It is obvious that as the plate 82 is slid forward and back it will travel onto and off the plate 79 and will thus open and close the circuit. Any suitable means may be provided to cause the plate 82 to move for each revolution of the wheels. In the construction shown the plate 82 has hinged to it a lever 85, said lever being pivoted at 86 to the frame of the truck. The lever 85 has secured to it an angular frame 87, which takes around an eccentric 88, mounted on the axle 89 of the wheels 90. With the construction described it is obvious that with each revolution of the wheel the lever 85 will be given a rocking movement on the pivot 86 and cause a reciprocating movement of the plate 82, thus opening and closing the circuit 78 to the magnet 74.

Any suitable recording-surface may be used for the recording instruments hereinbefore described, and this recording-surface may be mounted and moved in any desired manner. In the construction shown the recording-surface consists of a strip of paper 90, drawn from a roller which is mounted in suitable bearings 91, secured to the frame 1. The paper 90 passes over a drum 92, said drum being supported in bearings 93, formed in suitable uprights 94, secured to the frame 1. While this drum 92 might be positively driven, it is preferably loosely mounted, so as to be turned by the advancing paper strip. Any suitable means may be employed for drawing the paper from its reel and over the drum 92. In the construction shown the paper passes between a pair of friction-pulleys 95 and a roll 96. The roll 96 is driven at a definite speed by means of a spring-motor 97. This spring-motor is of ordinary form and its movement may be transmitted to the roll 96 through any suitable form of intermediate gearing. The pulleys 95 are mounted in arms 98, which turn loosely on a shaft 99. The arms 98 are preferably acted upon by springs 100, said springs operating to hold the arms in such a position that the pulleys 95 are pressed normally against the paper strip and the roll 96.

The operation of the apparatus is as follows: An operator is stationed in front of the ammeter and another operator is stationed in front of the voltmeter. The spring-motor which drives the paper strip 90 is started and the time-clock is also started. Power is then turned onto the car, and as the car starts up the operators, by means of the actuator-levers 8, cause the pointers 10 to follow the movements of the indicating-hands of the voltmeter and ammeter. The to-and-fro movement of the actuators as they follow the movements of the indicating-hands cause the carriages 20 and 21 to be moved forward and back on their rails 16 and 19. As the recording paper strip is being continuously driven through the clockwork 97 and the parts connected therewith, the recording instruments, which are connected with the carriages 20 and 21, will trace lines upon the paper. The line traced by the recording instrument on the carriage 20, which is connected with the actuator for the ammeter, will indicate the variations in the amperage of the current, and the line traced by the recording instrument on the carriage 21, which is connected with the actuator on the voltmeter, will indicate the changes in the voltage of the current. The recording instrument will trace upon the paper a series of short straight lines connected by what may be called a series of "inverted U's," said U's being produced by a movement of the magnet 48, which, as has been before described, is in circuit with the clock. The spaces between the upstrokes or downstrokes of these U's indicate a half-second. These inverted U's will be, of course, a constant distance apart, the distance depending upon the speed at which the paper is driven. The recording instrument for the revolution-counter will trace upon the paper a line similar in configuration to the line described as traced by the time-recording pencil; but the inverted-U portions of the line will vary in distance apart according to the number of wheel revolutions which are made. When the train is driven at a high speed, the inverted-U portions of this line will be much closer together than when the train is driven at a low speed. It will be seen, therefore, that the apparatus records simultaneously the amount of electric current, the voltage of said current, the succession of time instants during which the power is applied, and the number of wheel revolutions of the car. From the record thus produced, therefore, it is possible to deduce the amount of power used at any particular period or periods in the journey of the car and the relation between this amount of power and the number of wheel revolutions.

While the apparatus has been shown as applied to recording variations in electric power utilized for the purpose of running railway-trains, it is to be understood that it is by no means confined to such use. It may be used whenever it is desired to record the amount of power used in any machine in a given time, the number of machine movements produced by the power in said time, and the rate at which the power is consumed.

While the constructions which have been described for carrying out the several functions performed by the apparatus are the best now known to me, it is to be understood that the several functions may be carried out by apparatus which differs widely from that which has been shown and described. The invention is not, therefore, to be limited to the specific details of construction illustrated in the accompanying drawings and described in the foregoing specification.

What I claim is—

1. The combination with a plurality of meters having movable indicators, of a plurality of actuators one for each meter, the actuator and indicator for each meter being arranged in the same visual field and the actuator being mounted to receive movements corresponding to the movements of the indicator, and a recorder operated by each actuator, substantially as described.

2. The combination with a plurality of meters having movable indicators, of a plurality of manually-operated actuators one for each meter, the actuator and indicator for each meter being arranged in the same visual field and the actuator being mounted to receive movements corresponding to the movements of the indicator, and a recorder operated by each actuator, substantially as described.

3. The combination with a plurality of meters having movable indicators, of a plurality of actuators one for each meter, the actuator and indicator for each meter being arranged in the same visual field and the actuator being mounted to receive movements corresponding to the movements of the indicator, a recorder operated by each actuator, and a time-recorder, the recorders being arranged to make simultaneous records, substantially as described.

4. The combination with a plurality of meters having movable indicators, of a plurality of manually-operated actuators one for each meter, the actuator and indicator for each meter being arranged in the same visual field and the actuator being mounted to receive movements corresponding to the movements of the indicator, a recorder operated by each actuator, and a time-recorder, the recorders being arranged to make simultaneous records, substantially as described.

5. The combination with a meter having a movable indicator, of an actuator independent of the indicator, said actuator and indicator being arranged in the same visual field and the actuator being mounted to receive movements corresponding to the movements of the indicator, a recorder, and connections between the recorder and the actuator, substantially as described.

6. The combination with a meter having a movable indicator, of a manually-operated actuator independent of the indicator, said actuator and indicator being arranged in the same visual field and the actuator being mounted to receive movements corresponding to the movements of the indicator, a recorder, and connections between the recorder and the actuator, substantially as described.

7. The combination with a meter having a movable indicator, of an actuator independent of the indicator, said actuator and indicator being arranged in the same visual field and the actuator being mounted to receive movements corresponding to the movements of the indicator, a recorder, connections between the recorder and the actuator, and a time-recorder, said recorders being arranged to make simultaneous records, substantially as described.

8. The combination with a meter having a movable indicator, of a manually-operated actuator independent of the indicator, said actuator and indicator being arranged in the same visual field and the actuator being mounted to receive movements corresponding to the movements of the indicator, a recorder, connections between the recorder and the actuator, and a time-recorder, said recorders being arranged to make simultaneous records, substantially as described.

9. The combination with a meter having a movable indicator, of a manually-operated actuator mounted to receive movements corresponding to the movements of the indicator, a recorder, connections between the recorder and the actuator, a time-recorder, and a movement-recorder, said recorders being arranged to make simultaneous records, substantially as described.

10. The combination with a meter having a movable indicator, of a manually-operated actuator arranged in the same visual field as the indicator and mounted to receive movements corresponding to the movements of the indicator, a recording device connected with the actuator, a time-recording device, and means for moving a recording-surface past the recording devices, substantially as described.

11. The combination with a meter having a movable indicator, of a manually-operated actuator mounted to receive movements corresponding to the movements of the indicator, a recording device connected with the actuator, a time-recording device, a movement-recording device, and means for moving a recording-surface past the recording devices, substantially as described.

12. In an electric-power-recording device, the combination with a current-meter having a movable indicator, of an actuator arranged in the same visual field as the indicator and mounted to receive movements corresponding to the movements of the indicator, and a recorder connected with the actuator, substantially as described.

13. In an electric-power-recording device, the combination with a current-meter having a movable indicator, of an actuator mounted to receive movements corresponding to the movements of the indicator, a recorder connected with the actuator, and a time-recorder, said recorders being arranged to make simultaneous records, substantially as described.

14. In an electric-power-recording device, the combination with a current-meter having a movable indicator, of an actuator arranged in the same visual field as the indicator and mounted to receive movements corresponding to the movements of the indicator, a recorder connected with the actuator, and a time-recorder, said recorders being arranged to make simultaneous records, substantially as described.

15. In an electric-power-recording device, the combination with a current-meter having a movable indicator, of an actuator mounted to receive movements corresponding to the movements of the indicator, a recorder connected with the actuator, a time-recorder, and a movement-recorder, said recorders being arranged to make simultaneous records, substantially as described.

16. In an electric-power-recording device, the combination with a current-meter having a movable indicator, of an actuator arranged in the same visual field as the indicator and mounted to receive movements corresponding to the movements of the indicator, a recorder connected with the actuator, a time-recorder, and a movement-recorder, said recorders being arranged to make simultaneous records, substantially as described.

17. In an electric-power-recording device, the combination with a current-meter having a movable indicator, of a manually-operated actuator arranged in the same visual field as the indicator and mounted to receive movements corresponding to the movements of the indicator, and a recorder connected with the actuator, substantially as described.

18. In an electric-power-recording device, the combination with a current-meter having a movable indicator, of a manually-operated actuator arranged in the same visual field as the indicator and mounted to receive movements corresponding to the movements of the indicator, a recorder connected with the actuator, and a time-recorder, said recorders being arranged to make simultaneous records, substantially as described.

19. In an electric-power-recording device, the combination with a current-meter having a movable indicator, of a manually-operated actuator mounted to receive movements corresponding to the movements of the indicator, a recorder connected with the actuator, a time-recorder, and a movement-recorder, said recorders being arranged to make simultaneous records, substantially as described.

20. In an electric-power-recording device, the combination with a current-meter having a movable indicator, of a manually-operated actuator arranged in the same visual field as the indicator and mounted to receive movements corresponding to the movements of the indicator, a recorder connected with the actuator, a time-recorder, and a movement-recorder, said recorders being arranged to make simultaneous records, substantially as described.

21. In an electric-power-recording device, the combination with an ammeter having a movable indicator, of a voltmeter having a movable indicator, an actuator for each meter mounted to receive movements corresponding to the movements of the indicators of each of said meters, a time-recorder, and a movement-recorder, said recorders being arranged to make a simultaneous record, substantially as described.

22. In an electric-power-recording device, the combination with an ammeter having a movable indicator, of a voltmeter having a movable indicator, an actuator for each meter arranged in the same visual field as the indicator and mounted to receive movements corresponding to the movements of said indicator, a time-recorder, and a movement-recorder, said recorders being arranged to make a simultaneous record, substantially as described.

23. In an electric-power-recording device, the combination with an ammeter having a movable indicator, of a voltmeter having a movable indicator, a manually-operated actuator for each meter arranged in the same visual field as the indicator and mounted to receive movements corresponding to the movements of the indicator of each of said meters, a recorder connected with each actuator, and a time-recorder, said recorders being arranged to make simultaneous records, substantially as described.

24. In an electric-power-recording device, the combination with an ammeter having a movable indicator, of a voltmeter having a movable indicator, of a manually-operated actuator for each meter mounted to receive movements corresponding to the movements of the indicators of each of said meters, a recorder connected with each actuator, a time-recorder, and a movement-recorder, said recorders being arranged to make simultaneous records, substantially as described.

25. In an electric-power-recording device, the combination with an ammeter having a movable indicator, of a voltmeter having a movable indicator, of a manually-operated actuator for each meter arranged in the same visual field as the indicator thereof and mounted to receive movements corresponding to the movements of said indicator, a recorder connected with each actuator, a time-recorder, and a movement-recorder, said recorders being arranged to make simultaneous records, substantially as described.

26. In a recording device, the combination with a meter having a movable indicator, of a manually-operated actuator arranged in the same visual field as the indicator and mounted to receive movements corresponding to the movements of the indicator, a carriage, a recording instrument mounted on the carriage, connections between the carriage and the actuator, and means for advancing a recording-surface past the recording instrument, substantially as described.

27. In a recording device, the combination with a meter having a movable indicator, of a manually-operated actuator arranged in the same visual field as the indicator and mounted to receive movements corresponding to the movements of the indicator, a carriage, a recording instrument mounted on the carriage, flexible connections between the carriage and the actuator, and means for advancing a recording-surface past the recording instrument, substantially as described.

28. In a recording device, the combination with a plurality of meters having movable indicators, of a plurality of manually-operated actuators, one for each meter, the actuator and indicator for each meter being arranged in the same visual field and the actuator being mounted to receive movements corresponding to the movements of the indicator, a plurality of carriages, one for each actuator, connections between each carriage and its actuator, a recording instrument mounted on each carriage, and means for advancing a recording-surface past the recording instruments, substantially as described.

29. The combination with a meter having a movable indicator, of an actuator mounted to receive movements corresponding to the movements of the indicator, a recorder, connections between the actuator and recorder, a time-recording device, a clock mechanism, electrical operating devices for the time-recording device controlled by the clock mechanism, and means for advancing a recording-surface past the recording devices, substantially as described.

30. The combination with a meter having a movable indicator, of a manually-operated actuator arranged in the same visual field as the indicator and mounted to receive movements corresponding to the movements of the indicator, a recorder, connections between the actuator and recorder, a time-recording device, a clock mechanism, electrical operating devices for the time-recording device controlled by the clock mechanism, and means for advancing a recording-surface past the recording devices, substantially as described.

31. The combination with a clock mechanism, of a carrier including a pair of pivoted arms supporting a recording instrument, means for advancing a recording-surface past the carrier, a magnet for operating the carrier, a suitable circuit for the magnet, and a circuit-closing device operated from the clock mechanism, substantially as described.

32. The combination with a clock mechanism, of a carrier for a recording instrument, means for advancing a recording-surface past the carrier, a magnet for operating the carrier, a suitable circuit for the magnet, said circuit being connected to the escapement-lever of the clock, and a contact in the path of movement of said escapement-lever, substantially as described.

33. The combination with a clock mechanism, of a carrier including a pair of pivoted arms supporting a recording instrument, means for advancing a recording-surface past the carrier, a magnet for operating the carrier, a suitable circuit for the magnet, said circuit being connected to the escapement-lever of the clock, and a contact in the path of movement of said escapement-lever, substantially as described.

34. The combination with a clock mechanism, of a carrier for a recording instrument, means for advancing a recording-surface past the carrier, a magnet for operating the carrier, a suitable circuit for the magnet, said circuit being connected to the escapement-lever of the clock, and an adjustable contact in the path of movement of said escapement-lever, substantially as described.

35. The combination with a clock mechanism, of a carrier for a recording instrument, means for operating said carrier, said means including an electromagnet, a suitable circuit for the magnet, said circuit being connected to the escapement-lever of the clock, a pivoted lever carrying a contact to which the circuit is also connected, means for adjusting the lever, and means for locking it in its adjusted position, substantially as described.

36. The combination with a carrier for a recording instrument, of means for feeding a recording-surface past the carrier, operating devices for the carrier including an electromagnet, a circuit for said magnet, said circuit including the escapement-lever of the clock, a contact in the path of said escapement-lever, a lever on which the contact is mounted, a block on which the lever is pivoted, said block having an overhanging portion, an extension on the lever, and a set-screw operating against said extension, substantially as described.

37. The combination with a carrier having a recording instrument, of means for feeding a recording-surface past the carrier, operating devices for the carrier including an electromagnet, a circuit for said magnet, said circuit including the escapement-lever of the clock, a contact in the path of said escapement-lever, a lever on which the contact is mounted, a block on which the lever is pivoted, said block having an overhanging portion, an extension on the lever, a set-screw operating against said extension, and a second set-screw by which the first screw is locked in position, substantially as described.

38. In a recording device, a carrier for a recording instrument consisting of a pair of pivoted arms, a holder carried by the arms, means for feeding a recording-surface past the holder, and means for rocking the arms on their pivots, substantially as described.

39. In a recording device, a carrier for a recording instrument consisting of a pair of pivoted arms, a holder carried by the arms, means for feeding a recording-surface past the holder, and means including a magnet for rocking the arms on their pivots, substantially as described.

40. In a recording device, the combination with a pair of pivoted arms, of a holder carried by the arms, an armature-lever connected to the arms, a spring for moving the arms in one direction, and a magnet for moving the armature in the other direction, substantially as described.

41. In a recording device, the combination with a pair of pivoted arms, of a holder carried by the arms, an armature-lever connected to the arms, a spring for moving the arms in one direction, a magnet for moving the armature in the other direction, and a stop for limiting the movement of the arms in both directions, substantially as described.

42. In a recording apparatus, the combination with means for supporting and advancing a recording-surface, of a pair of arms located one behind the other, a holder for a recording instrument carried by the arms and supporting the instrument at an angle to the recording-surface, means for holding the recording instrument yieldingly against the surface, and means for rocking the arms, substantially as described.

43. In a recording apparatus, the combination with means for advancing a recording-surface, of a pair of arms located one behind the other, a holder carried by the arms and supporting a recording instrument at an angle to the surface, means for holding the recording instrument yieldingly against the surface, and means for rocking the arms, said means including an armature-lever connected with the arms and a suitable electromagnet, substantially as described.

44. In a recording apparatus, the combination with a pair of pivoted arms, a holder carried by the arms, a connection between the arms parallel to the holder, an armature-lever extending from said connection, a magnet for operating said armature-lever, whereby the arms are rocked on their pivots, and a spring operating to move the arms in a direction opposite to the movement produced by the armature-lever, substantially as described.

45. The combination with an electric meter having a pivoted indicator, of a pivoted manually-operated actuator having its pivot concentric with the pivot of the indicator, a recording device, and connections between the recording device and the actuator, substantially as described.

46. The combination with an electric meter, having a pivoted indicator, of a pivoted manually-operated actuator having its pivot concentric with the pivot of the indicator, a carriage, a recording instrument supported thereon, flexible connections between the actuator and the carriage, and means for advancing a recording-surface past the recording instrument, substantially as described.

47. The combination with an electric meter having a pivoted indicator, of a pivoted manually-operated actuator having its pivot concentric with the pivot of the indicator, a carriage, a recording instrument supported thereon, adjustable flexible connections between the actuator and the carriage, and means for advancing a recording-surface past the recording instrument, substantially as described.

48. The combination with an ammeter and a voltmeter, each of which has a pivoted indicator, of a pivoted actuator for each meter, the pivots of said actuators being concentric with the pivots of the indicators, a carriage for each actuator, a drum on each actuator, a wire passing around each drum and adjustably connected to each carriage, a recording instrument supported by each carriage, and means for advancing a recording-surface past the instruments, substantially as described.

49. The combination with an ammeter and a voltmeter, each of which has a pivoted indicator, of a pivoted actuator for each meter, the pivots of said actuators being concentric with the pivots of the indicators, a carriage for each actuator, a drum for each actuator, a wire passing around each drum and adjustably connected to each carriage, a recording instrument supported by each carriage, a clock mechanism, a recording instrument controlled by the clock mechanism, a revolution-recording instrument, and means for advancing a recording-surface past the recording instruments, substantially as described.

In testimony whereof I have hereunto set my hand in the presence of two subscribing witnesses.

JOHN D. KEILEY.

Witnesses:
 A. A. V. BOURKE,
 G. M. BORST.